United States Patent [19]

Drori

[11] Patent Number: 4,654,143
[45] Date of Patent: Mar. 31, 1987

[54] MULTIPLE-DISC TYPE FILTER WITH EXTENSIBLE SUPPORT

[76] Inventor: Mordeki Drori, 89 Zahal Street, Kiron, Israel

[21] Appl. No.: 709,373

[22] Filed: Mar. 7, 1985

[51] Int. Cl.⁴ .............................................. B01D 29/46
[52] U.S. Cl. ..................................... 210/232; 210/332; 210/352; 210/407; 210/488
[58] Field of Search ............... 210/108, 232, 238, 350, 210/351, 352, 354, 355, 356, 411, 488, 492, 332, 407

[56] References Cited

U.S. PATENT DOCUMENTS

| | | | |
|---|---|---|---|
| 1,797,399 | 3/1931 | Boulade | 210/488 |
| 2,330,945 | 10/1943 | Becker | 210/444 |
| 2,365,525 | 12/1944 | Cox | 210/492 |
| 2,575,995 | 11/1951 | Briggs | 210/492 |
| 2,670,851 | 3/1954 | Curtis | 210/488 |
| 2,847,126 | 8/1958 | Goodman | 210/411 |
| 3,105,042 | 9/1963 | Roosa | 210/444 |
| 3,561,602 | 2/1971 | Molitor | 210/488 |
| 3,622,003 | 11/1971 | Czech | 210/411 |
| 4,062,774 | 12/1977 | Hinojosa | 210/444 |
| 4,115,274 | 9/1978 | Boddeker | 210/346 |
| 4,156,651 | 5/1979 | Mehoudar | 210/108 |
| 4,267,042 | 5/1981 | Hofmann | 210/444 |
| 4,267,045 | 5/1981 | Hoof | 210/322 |
| 4,402,829 | 9/1983 | Cordua | 210/488 |
| 4,430,232 | 2/1984 | Boucet | 210/798 |
| 4,481,111 | 11/1984 | Christophe | 210/345 |
| 4,552,655 | 11/1985 | Granot | 210/488 |
| 4,552,662 | 11/1985 | Webster | 210/444 |

FOREIGN PATENT DOCUMENTS

| | | | |
|---|---|---|---|
| 549633 | 12/1957 | Canada | 210/492 |
| 1157258 | 5/1958 | France | 210/488 |

Primary Examiner—Ernest G. Therkorn
Attorney, Agent, or Firm—Cushman, Darby & Cushman

[57] ABSTRACT

A multiple-disk type filter including a stack of filter disks disposed in a housing and an extensible support for the stack of filter disks, the extensible support including first and second end elements and a multiplicity of rod members joining the first and second end elements in sliding relationship, the multiplicity of rod members being arranged in slidable engagement with at least one of the first and second end elements, and stop apparatus for limiting extension of the support.

13 Claims, 8 Drawing Figures

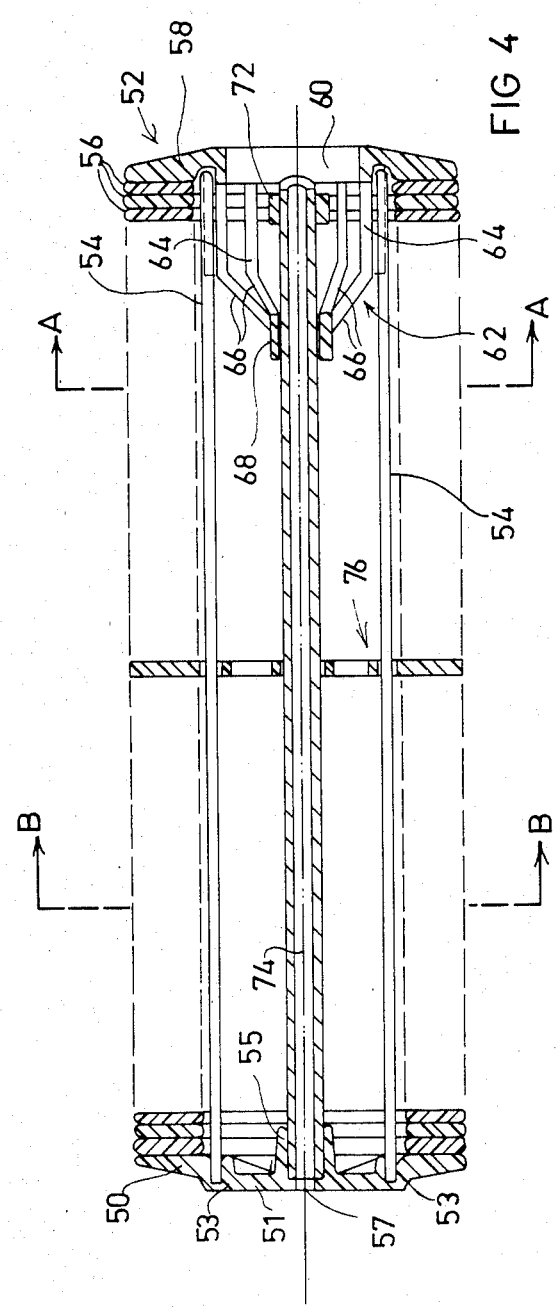

MULTIPLE-DISC TYPE FILTER WITH EXTENSIBLE SUPPORT

FIELD OF THE INVENTION

The present invention relates to filters and particularly to multiple-disc type filters useful in filtering particles from water and in many other applications.

BACKGROUND OF THE INVENTION

Multiple-disc type filters generally include a housing in which the filter body within the housing is in the form of a stack of like, centrally-apertured, filter discs of substantially uniform thickness along their widths and having grooved side faces defining filtering channels between the adjacent discs in the stack. In some applications of such filters, the outer face of the stack of filter discs constitutes the upstream side of the filter, in which case the fluid being filtered passes from the outer face to the inner face of the stack. In other applications of such filters, the inner face of the stack constitutes the upstream side of the filter, in which case the fluid being filtered passes from the inner to the outer face through the filter stack.

Multiple-disc type filters have a number of advantages over other known types of filters, for example, the cylindrical-screen type filter. Thus, the multiple-disc filter has a larger capacity for removing and retaining dirt particles, since these may be retained also between the side faces of the discs, in addition to being retained on the upstream surface as in the cylindrical-screen type filter. Another advantage in the multiple-disc filter is that it is not as easily ruptured as the screen type and therefore there is less danger that because of a malfunction, unfiltered water may pass through and clog sprinklers or other devices downstream of the filter. The latter advantage is particularly important in self-cleaning filters wherein the upstream face of the filter is cleaned by a cleaning nozzle which, in the case of a screen-type filter, may rupture the screen by particles becoming wedged between the cleaning nozzle and the filter screen.

The stack of discs in the multiple-disc type filter has hitherto been supported internally by a cylinder pierced with holes so as to allow the fluid being filtered to flow therethrough. Since the stack is held in position by fastening members at each end, as for example by annular screws which move about threaded extensions of the cylinder at each end thereof, the removal of discs for inspection or replacement can be a laborious process. The necessity for the threaded extensions adds to the size and cost of the equipment and is not practical for non-in line systems.

SUMMARY OF THE INVENTION

The present invention relates to a novel form of support for the stack of discs in a multiple-disc type filter which overcomes the disadvantages of the cylindrical kind of support.

There is thus provided in accordance with an embodiment of the present invention, a multiple-disc type filter comprising a stack of filter disks disposed in a housing, an extensible support for the stack of filter disks, the extensible support including first and second end elements and a multiplicity of rod members joining at least one of the first and second end elements in sliding relationship, and stop apparatus for limiting the extension of the support.

According to one embodiment of the invention, the multiplicity of rod members are arranged for fixed engagement with the first end element and for slidable supporting engagement with the second end element. According to another embodiment of the invention the rod members are arranged for slidable supporting engagment with both the first and second end elements.

According to a preferred embodiment of the invention, the second end element defines a plurality of slidable mounting channels for accomodating the rod members, a plate portion defining a central fluid flow aperture and a stop engagement portion.

According to one embodiment of the invention, the first end element is constructed to be identical to the second end element.

Additionally in accordance with an embodiment of the present invention there is provided a spacer support which fixedly joins the multiplicity of rod members intermediate the first and second end elements.

Further in accordance with an embodiment of the present invention, the stop apparatus comprises an elongated rod extending axially through the stack and having transverse extensions adjacent at least one end thereof for engaging the stop engagement portions of the second end element for preventing disengagement of the second end element from the rods.

Further in accordance with an embodiment of the invention, the outer extent of the spacer support corresponds to the inner radius of the stack of filter disks.

According to an alternative embodiment of the present invention, the outer extent of the spacer support corresponds to the outer radius of the stack of filter disks.

BRIEF DESCRIPTION OF THE DRAWINGS

The present invention will be understood and appreciated more fully from the following detailed description taken in conjunction with the drawings in which:

FIG. 4 is a sectional illustration of a filtration unit constructed and operative in accordance with an alternative embodiment of the present invention;

FIG. 5 is a sectional illustration of the filtration apparatus of FIG. 4 taken along the lines A—A in FIG. 4;

FIG. 6 is a sectional illustration of the filtration apparatus of FIG. 4 taken along the lines B—B in FIG. 4;

DETAILED DESCRIPTION OF A PREFERRED EMBODIMENT

Figure 1:
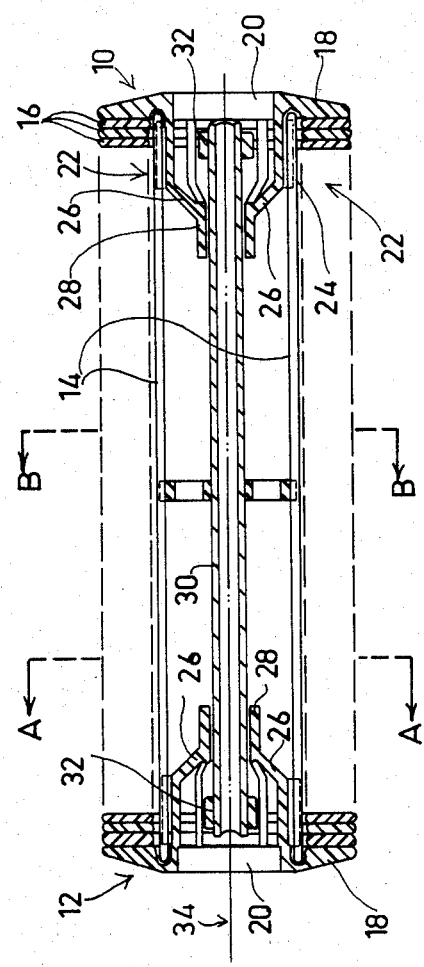
FIG. 1 is a sectional illustration of a filtration unit constructed and operative in accordance with a preferred embodiment of the present invention.
Figure 2:
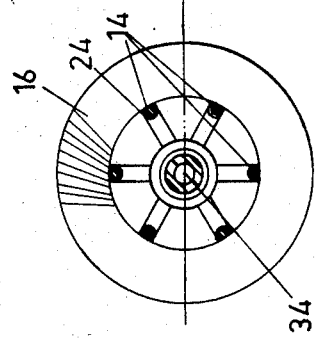
FIG. 2 is a sectional illustration of the filtration apparatus of FIG. 1 taken along the lines A—A in FIG. 1.
Figure 3:
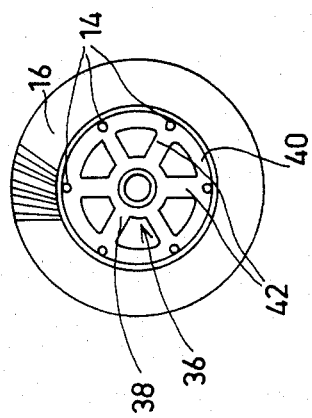
FIG. 3 is a sectional illustration of the filtration apparatus of FIG. 1 taken along the lines B—B in FIG. 1.

Referring now to FIGS. 1–3, there is seen a filtration unit constructed and operative in accordance with a preferred embodiment of the present invention. The filtration unit comprises first and second end assemblies 10 and 12, which are typically identical, a plurality of support rods 14, which are slidably mounted in a generally cylindrical pattern on the first and second end assemblies and a stack of filter discs 16 which are supported between end assemblies 10 and 12 on support rods 14.

The first and second end assemblies 10 and 12 each typically comprise a generally planar end portion 18 having a central aperture 20. A plurality of ribs 22 extend from planar end portion 18. Each rib includes a first axial portion 24 which defines a rod support, and an inwardly directed portion 26. The inwardly directed portions 26 of the individual ribs 22 terminate at a cylindrical collar 28.

A central rod or shaft 30 extends axially along the entire length of the filter disc stack and through respective collars 28 on the first and second end assemblies. Stopper sleeves 32 are formed adjacent the ends of the central rod or shaft 30 at both ends thereof, outwardly of respective collars 28 to restrict the amount that the first and second end assemblies 10 and 12 may be axially separated along the longitudinal axis 34 of the filtration unit.

A spacer 36 is fixedly mounted onto central shaft 30 and to rods 14 approximately halfway between first and second end assemblies 10 and 12. Spacer 36 provides structural stability to the support structure for the stack of filter discs. Spacer 36 is constructed to have an inner collar member 38 and an outer ring 40 which defines slots for seating of rods 14. The inner collar member 38 and outer ring 40 are joined by a plurality of spokes 42.

It is appreciated that in the embodiment of FIGS. 1–3, both of the end assemblies are axially slidable with respect to the spacer rods 14 to permit spreading apart of the individual filter discs from discs adjacent thereto for the purpose of cleaning particles therefrom.

Reference is now made to FIGS. 4–6 which illustrate another preferred embodiment of the invention. Here the filtration unit comprises first and second end assemblies 50 and 52, which are normally not identical, a plurality of support rods 54, which are arranged in a generally cylindrical pattern and fixedly mounted onto the first end assembly 50 and slidably mounted onto the second end assembly 52. A stack of filter discs 56 is supported between end assemblies 50 and 52 on support rods 54.

First end assembly 50 comprises a planar end portion 51 in which are formed a plurality of bores 53 for end seating of rods 54 and a seating collar 55 which may communicate with an aperture 57 formed in end portion 51.

The second end assembly 52 typically comprises a generally planar end portion 58 having a central aperture 60. A plurality of ribs 62 extend from planar end portion 58. Each rib includes a first axial portion 64 which defines a rod support, and an inwardly directed portion 66. The inwardly directed portions 66 of the individual ribs 62 terminate at a cylindrical collar 68.

A central rod or shaft 70 extends axially along the entire length of the filter disc stack. Shaft 70 is fixedly seated in collar 55 on end assembly 50 and extends slidably through collar 68 on the second end assembly. A stopper sleeve 72 is formed adjacent the end of the central rod or shaft 70 at the end thereof which lies outwardly of collar 58 to restrict the amount that the first and second end assemblies 50 and 52 may be axially separated along the longitudinal axis 74 of the filtration unit.

A spacer 76 is fixedly mounted onto central shaft 70 and slidably mounted onto rods 54 approximately halfway between first and second end assemblies 50 and 52. Spacer 76 provides structural stability to the support structure for the stack of filter discs. Spacer 76 is constructed to have an inner collar member 78 and an outer ring 80 which defines holes 82 for slidable engagement with rods 54. Ring 80 extends to an outer radius which corresponds to the outer dimensions of filter discs 56. The inner collar member 78 and outer ring 80 are joined by a plurality of spokes 82.

It is appreciated that in the embodiment of FIGS. 4–6, only one of the end assemblies is axially slidable with respect to the spacer rods 14 to permit spreading apart of the individual filter discs from discs adjacent thereto for the purpose of cleaning particles therefrom. It is further appreciated that any of the features of the embodiment of FIGS. 1–3 may be combined with any of the features of the embodiment of FIGS. 4–6 to produce a suitable filtration unit, which is also within the scope of the present invention.

Figure 7:
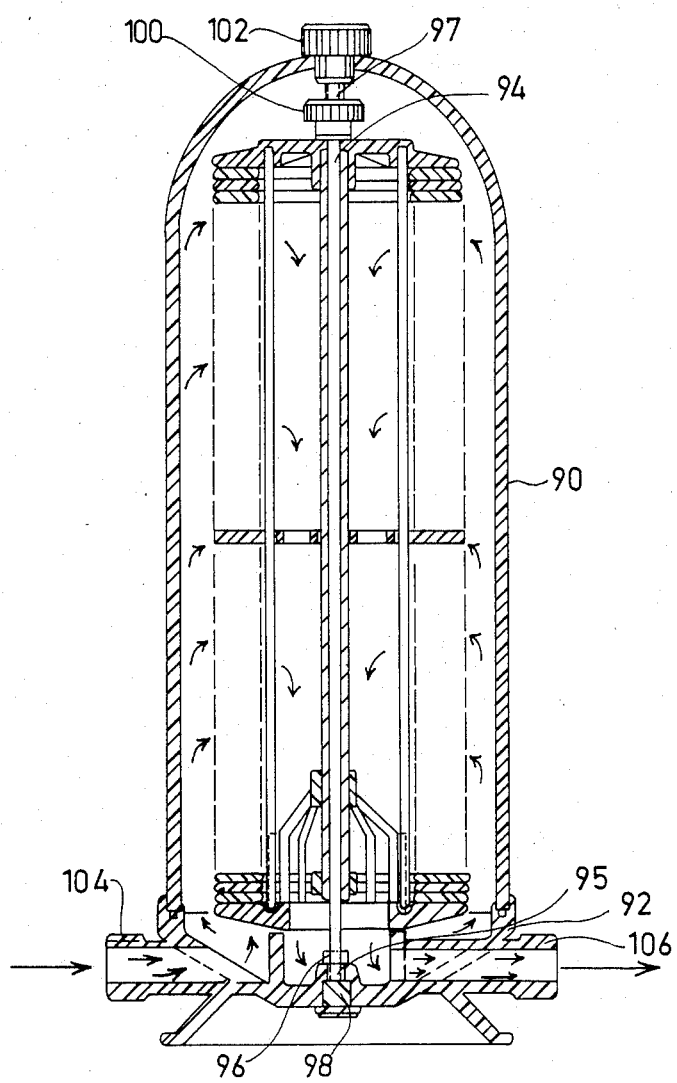
FIG. 7 is a sectional illustration of a filter employing the filtration apparatus of FIGS. 4–6.

Reference is now made to FIG. 7 which illustrates a filter employing a filtration unit of the type described in connection with FIGS. 4–6. It is appreciated that alternatively, the filtration unit may be of the type illustrated in FIGS. 1–3 or have a combination of the features of the two embodiments. The filter includes a generally bell-shaped housing 90, which is mounted on a mounting base 92. A filtration unit of the type described hereinabove is disposed within housing 90.

A central securing rod 94, having first and second threaded ends 95 and 97, is secured to base 92 at threaded end 95 by means of internally threaded nuts 96 and 98. A nut 100, threaded at end 97, secures the filtration unit onto base 92 and maintains the nut in its non-extended orientation for filtering opeation and an additional nut 102 secures housing 90 onto base 92.

In the illustrated embodiment, base 92 defines a liquid inlet 104 which communicates with the outer cylindrical surface of the filtration unit and a liquid outlet 106 which communicates with the inner cylindrical surface of the filtration unit. The arrows appearing in FIG. 7 indicate the flow of liquid through the unit. It is appreciated that base 92 may readily be modified to provide an oppositely directed flow or may be formed with a movable baffle or baffles to permit selection of the direction of flow.

Figure 8:
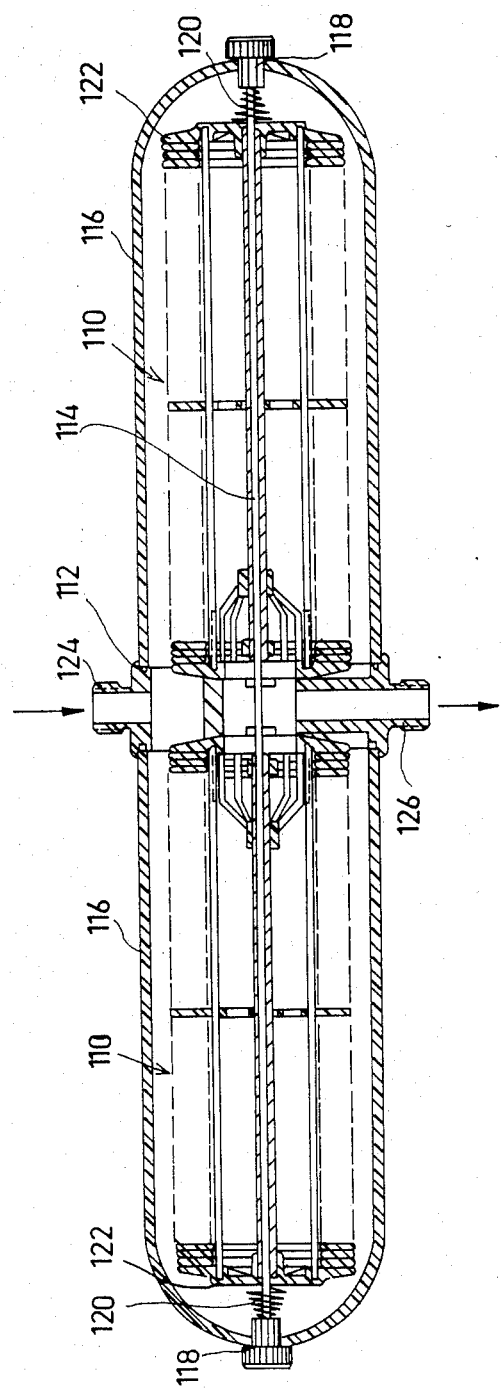
FIG. 8 is a sectional illustration of a double filter employing the filtration apparatus of FIGS. 4–6.

Reference is now made to FIG. 8 which illustrate a double capacity filter employing the filtration units of the type described hereinabove in connection with FIGS. 4–6. In principle, two units 110, each generally of the type illustrated in FIGS. 4–6 are placed end to end in communication with a common base 112. A single rod 114 threaded at both ends, traverses the entire unit and is operative in cooperation with a pair of threaded screws 118 to secure the individual housing elements 116 to base 112. The filtration units are mounted onto base 112 by means of a pair of compression springs 120 which are seated on the axial inner facing surfaces of screws 118 and on the axially outer facing surfaces of respective end members 122 of the filtration units. Fluid to be filtered enters the apparatus at a port 124 and passes through the stack of filter discs from the outer cylindrical surface inwardly to the central cavity defined by the discs and out through an outlet port 126, in directions indicated by the arrows appearing in FIG. 8.

It is appreciated that in this and all other embodiment of the present invention illustrated herein, the indicated direction of flow of fluid therethrough may be changed by suitable modification of the flow paths.

It will be appreciated by persons skilled in the art that the present invention is not limited to what has been shown and described with particularity hereinabove. Rather the scope of the present invention is defined only by the claims which follow:

I claim:

1. A multiple-disk type filter comprising:

a housing;

a stack of filter disks disposed in said housing, said stack of filter disks being formed with a central hollow cylindrical volume interior thereof;

an extensible support for said stack of filter disks, said extensible support including first and second end elements and a multiplicity of rod members joining the first and second end elements in sliding relationship, the multiplicity of rod members being arranged interiorly of said filter disks in said central hollow cylindrical volume and in slidable supporting engagement with at least one of said first and second end elements;

at least one of said first and second end elements comprising a generally planar end portion disposed externally of said stack of filter disks, a plurality of ribs extending inwardly from said generally planar end portion into said central hollow cylindrical volume and a collar member supported by said plurality of ribs and disposed in said central hollow cylindrical volume;

a central shaft passing axially through said central hollow cylindrical volume and through said collar member in sliding engagement therewith; and stop apparatus for limiting the extension of the support and comprising a stop member fixedly mounted onto said central shaft adjacent an end thereof, thereby limiting the relative movement of said shaft relative to said collar member.

2. A filter according to claim 1 and wherein said multiplicity of rods is disposed in fixed engagement with said first end element and in slidable supporting engagement with said second end element.

3. A filter according to claim 1 and wherein said multiplicity of rods is disposed in sliding engagement with both said first and second end elements.

4. A filter according to claim 1 and also comprising a central securing rod operative to secure said first and second end members in a fixed tightened orientation.

5. A filter according to claim 4 and wherein said central securing rod is also operative to secure said housing over said stack of filter disks.

6. A filter according to claim 1 and also comprising a base element defining a fluid inlet and a fluid outlet.

7. A filtration unit for use in a multiple-disk type filter comprising:

a stack of filter disks, said stack of filter disks being formed with a central hollow cylindrical volume interior thereof;

an extensible support for said stack of filter disks, said extensible support including first and second end elements and a multiplicity of rod members joining the first and second end elements in sliding relationship, the multiplicity of rod members being arranged interiorly of said filter disks in said central hollow cylindrical volume and in slidable supporting engagement with at least one of said first and second end elements;

at least one of said first and second end elements comprising a generally planar end portion disposed externally of said stack of filter disks, a plurality of ribs extending inwardly from said generally planar end portion into said central hollow cylindrical volume and a collar member supported by said plurality of ribs and disposed in said central hollow cylindrical volume;

a central shaft passing axially through said central hollow cylindrical volume and through said collar member in sliding engagement therewith; and stop apparatus for limiting the extension of the support and comprising a stop member fixedly mounted onto said central shaft adjacent an end thereof, thereby limiting the relative movement of said shaft relative to said collar member.

8. A filtration unit according to claim 7 and wherein said multiplicity of rods is disposed in fixed engagement with said first end element and in slidable supporting engagement with said second end element.

9. A filtration unit according to claim 7 and wherein said multiplicity of rods is disposed in sliding engagement with both said first and second end elements.

10. A filter comprising:

a base;

first and second housing covers associated with said base;

first and second stacks of filter disks disposed in respective first and second housing covers, each stack of filter disks being formed with a central hollow cylindrical volume interior thereof;

an extensible support for each stack of filter disks, said extensible support including first and second elements and a multiplicity of rod members joining the first and second end elements in sliding relationship, the multiplicity of rod members being arranged interiorly of said filter disks in said central hollow cylindrical volume and in slidable supporting engagement with at least one of said first and second end elements;

at least one of said first and second end elements comprising a generally planar end portion disposed externally of said stack of filter disks, a plurality of ribs extending inwardly from said generally planar end portion into said central hollow cylindrical volume and a collar member supported by said plurality of ribs and disposed in said central hollow cylindrical volume;

a central shaft passing axially through said central hollow cylindrical volume of both said first and second stacks of filter disks and through each collar member in sliding engagement therewith; and stop apparatus for limiting the extension of the support and comprising a stop member fixedly mounted onto said central shaft adjacent an end thereof, thereby limiting the relative movement of said shaft relative to said collar member.

11. A filter according to claim 10 and wherein said multiplicity of rods is disposed in sliding engagement with both said first and second end elements.

12. A filter according to claim 10 and wherein said central securing rod is also operative to secure said first and second housing covers over said first and second stacks and with respect to said base.

13. A filter according to claim 10 and also comprising spring means separating said first and second housing covers from said first and second stacks.

* * * * *